United States Patent [19]
Kitamura

[11] Patent Number: 4,696,091
[45] Date of Patent: Sep. 29, 1987

[54] AUTOMATIC TOOL CHANGER

[75] Inventor: Koichiro Kitamura, Takaoka, Japan

[73] Assignee: Kitamura Machinery Co., Ltd., Toyama, Japan

[21] Appl. No.: 737,444

[22] Filed: May 24, 1985

[30] Foreign Application Priority Data

May 25, 1984 [JP] Japan .................................. 59-104805

[51] Int. Cl.[4] ........................................... B23Q 3/157
[52] U.S. Cl. .................................................... 29/568
[58] Field of Search ................ 29/568, 26 A; 211/1.5

[56] References Cited
U.S. PATENT DOCUMENTS

| | | | |
|---|---|---|---|
| 3,571,912 | 3/1971 | Kielma | 29/568 |
| 3,587,164 | 6/1971 | Davern | 29/568 |
| 3,688,387 | 9/1972 | Zettler | 29/568 |
| 3,932,924 | 1/1976 | Anderson | 29/568 |
| 4,427,325 | 1/1984 | Kielma et al. | 29/568 |

Primary Examiner—Z. R. Bilinsky
Attorney, Agent, or Firm—Wegner & Bretschneider

[57] ABSTRACT

During the automatic changing of tools between a spindle of a machine tool and a tool magazine, a changing operation of causing one of a pair of tool changing arms to stand by in the vicinity of the spindle to remove the used tool and another changing operation of causing the other tool changing arm to grip the tool to be used for the next operation on the tool magazine and stand by are performed alternately thereby reducing the tool changing time.

5 Claims, 3 Drawing Figures

AUTOMATIC TOOL CHANGER

BACKGROUND OF THE INVENTION

1. Field of the Invention

The present invention relates to an automatic tool changer for machine tools which are controlled automatically, e.g., NC machine tools.

2. Description of the Prior Art

In this type of known machine tool, an automatic tool changer which, on one hand, takes out from a tool magazine accomodating a large number of tools the desired tool for machining and supplies it to a spindle of the machine tool and which, on the other hand, removes the used tool from the spindle for replacement with the tool required for the next machining operation must be simple in construction and smooth, positive and fast in operation.

To meet these requirements, many different automatic tool changers have been propsed and generally these known automatic tool changer employ the single arm for affecting the demounting and mounting of tools between the spindle and the tool magazine thus giving rise to a disadvantage that the tool changing time is long.

SUMMARY OF THE INVENTION

It is an object of the present invention to provide an automatic tool changer so constructed that while the used tool on a spindle is being removed by the tool grip of one arm, the tool grip of the other arm holds the tool required for the next machining operation and stands by, thereby reducing the tool changing time.

It is another object of the invention to provide an automatic tool changer capable of effecting the desired tool changing as simply and quickly as possible.

To accomplish the above objects, an automatic tool changer according to the invention features that a pair of arms each having a tool grip and adapted to perform a separate tool changing operation are arranged in the vicinity of the spindle of a machine tool between the spindle and the tool magazine. Also, the tool changing operations of the arms are simplified as far as possible, to allow the tool magazine to accomodate as many tools as possible and simplify the apparatus. The tool magazine is composed of an endless chain including a large number of tool pots arranged at predetermined intervals and each having an axis parallel to the spindle.

In accordance with the invention, due to the provision of a pair of arms which are each provided with a tool grip and arranged so as to separately perform their tool changing operations in the vicinity of the spindle of a machine tool, after the operation of removing the tool used for the preceding operation from the spindle has been performed by one of the arms, the other arm which has gripped the tool required for the next operation at the tool magazine and has been standing by performs the operation of fitting the tool into the spindle and these operations are performed alternately thereby decreasing the tool changing time considerably. Also, since the tool changing operation of each arm comprises only simple movements such as lateral movement, longitudinal movement and 90-degree turning movement thus making the arm extremely simple in construction and since a so-called absolute address system is used in which each tool is positively returned to its specific tool spot, there are the advantageous effects of eliminating any erroneous tool selection and so on.

DESCRIPTION OF THE PREFERRED EMBODIMENT

Figure 1:
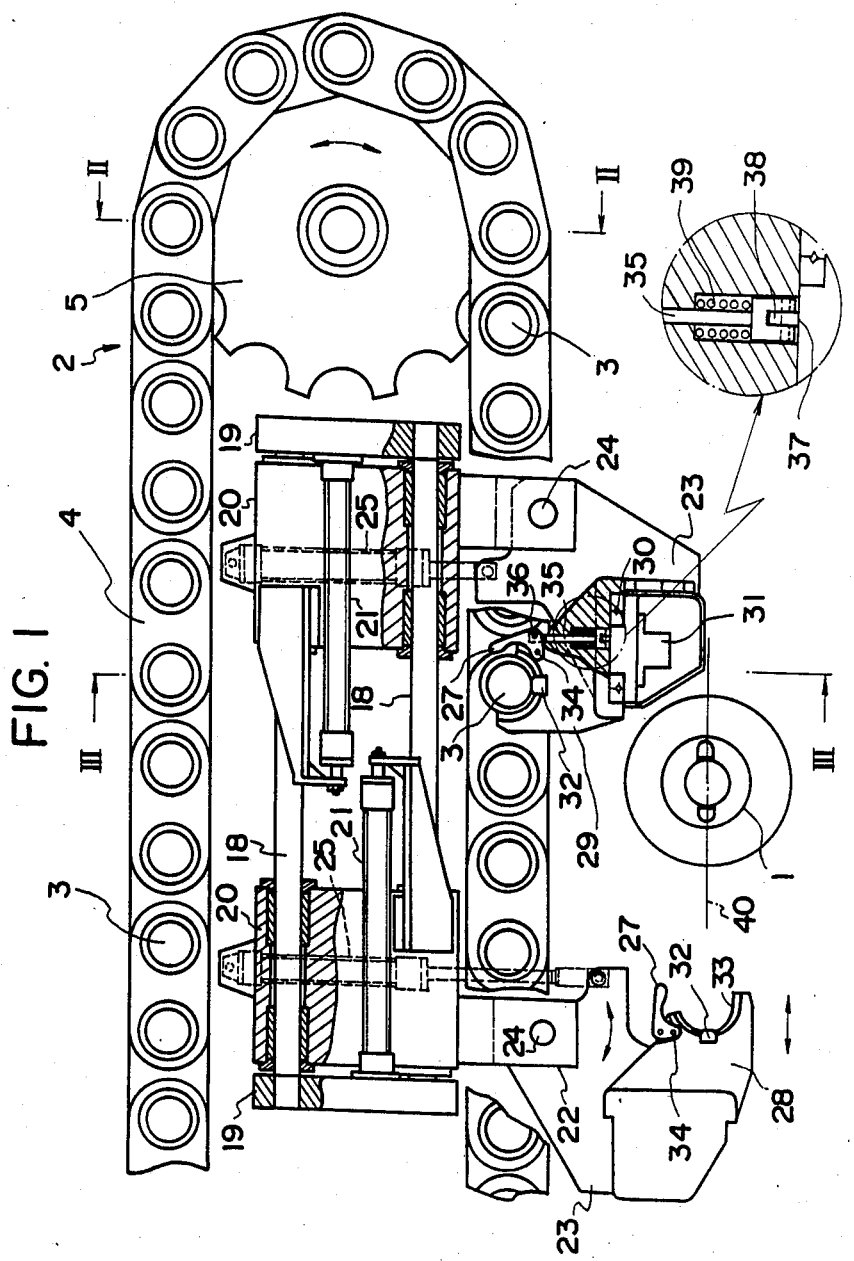
FIG. 1 is a partially cutaway front view of an embodiment of the present invention.
Figure 2:
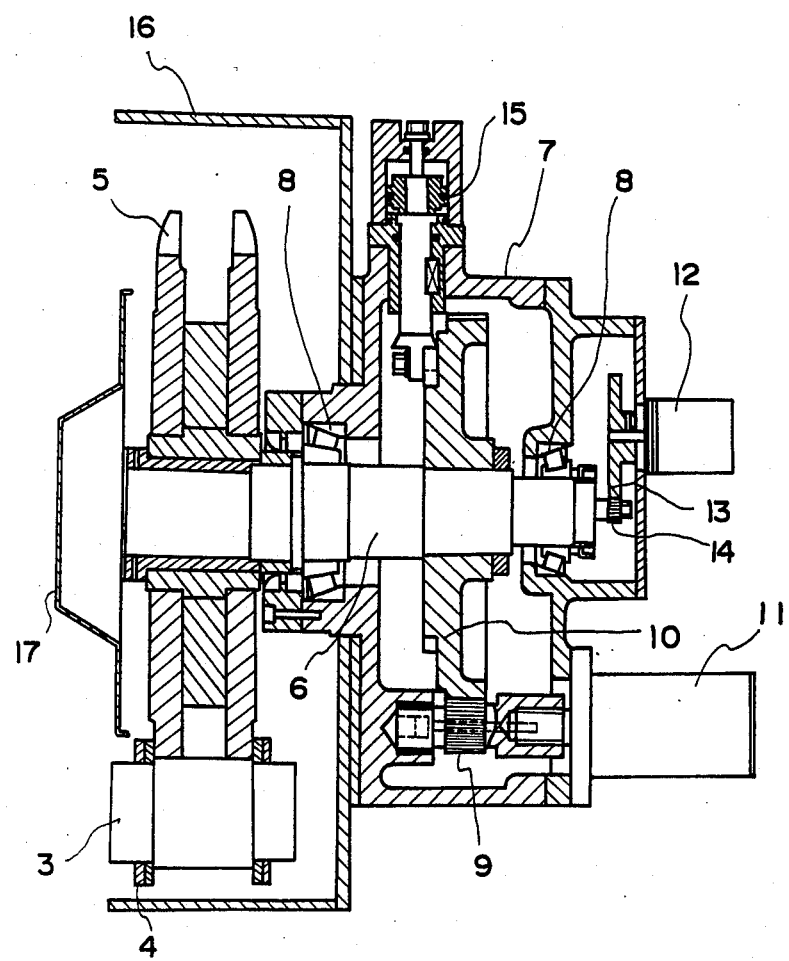
FIG. 2 is a sectional view taken respectively along the line II—II of FIG. 1.
Figure 3:
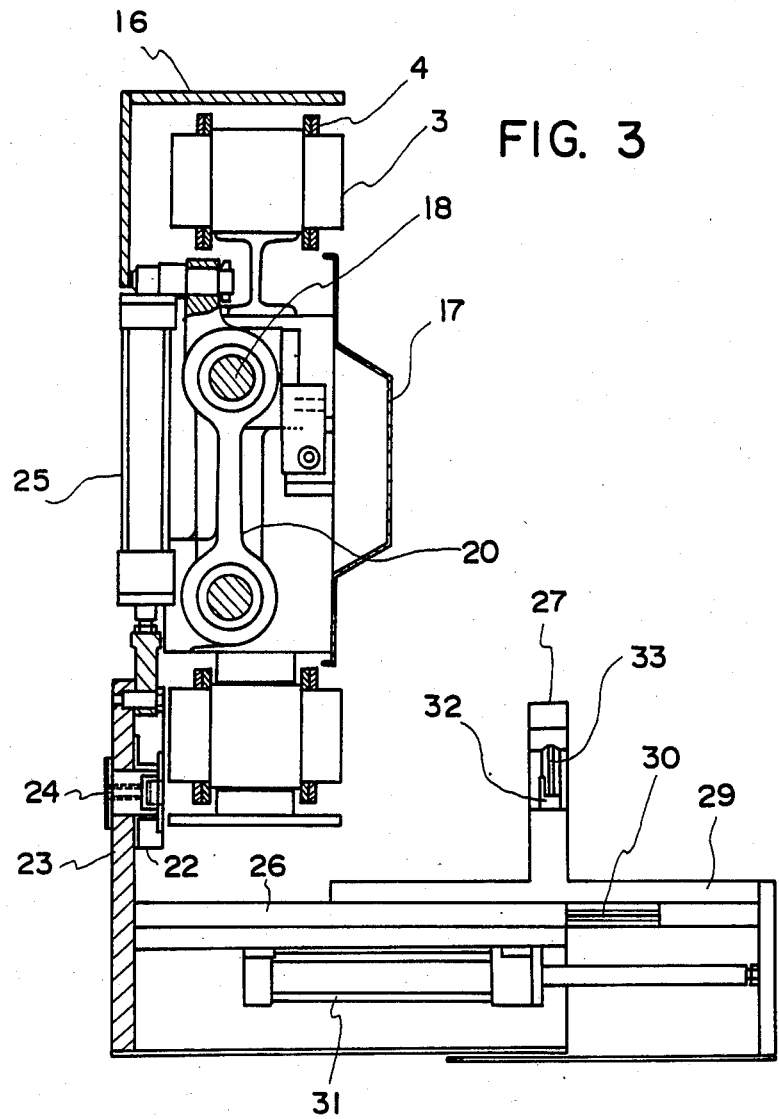
FIG. 3 is a sectional view taken respectively along the line III—III of FIG. 1.

Referring to FIGS. 1 to 3, numeral 1 designates a spindle of a machine tool which incorporates therein a mechanism for engaging and disengaging a holder fitted with a tool. Numeral 2 designates a tool magazine composed of an endless chain 4 including a large number of tool pots 3 which form receptacles for holders fitted with tools and arranged at regular intervals in such a manner that their axis extend parallel to the spindle 1. The endless chain 4 is reversely movable circularly and laterally in FIG. 1 or similarly movable vertically in a case where it is mounted vertically (not shown). Each tool pot 3 is provided therein with a mechanism (not shown) for engaging and disengaging a holder fitted with a tool. Numeral 5 designates a driving sprocket for the endless chain 4 and the other driven sprocket over which the endless chain 4 is extended is not shown. As shown in FIG. 2, a rotary shaft 6 of the driving sprocket 5 is supported in bearings 8 provided in a housing 7 and it is driven by a motor 11 through gears 9 and 10. Also, an encoder 12 is connected to the end of the rotary shaft 6 through gears 13 and 14 to detect the number of revolutions of the rotary shaft 6 and a cylinder unit 15 is detachably mounted on the gear 10 fixedly mounted on the rotary shaft 6 to determine the number of revolutions of the rotary shaft 6 or the indexed position of the endless chain 4 operable in association with the rotary shaft 6 in accordance with the detection signal from the encoder 12. Numeral 16 designates a box-type casing enclosing the endless chain 4 and the housing 7 of the driving sprocket 5 is attached to the back side of the casing 16. Numeral 17 designates a cover attached to the front side of the casing 16 and it is attached to arm supporting bases (see FIG. 3) which will be described later.

Then, as shown in FIGS. 1 and 3, supporting bases 19 having a pair of guide bars 18 parallel to the endless chain 4 are attached to the casing 16 in the space of the parallel extending endless chain 4. The suppoting bases 19 are provided with a pair of arm supporting slide bases 20 adapted to be moved toward and away in the opposite directions along the guide bars 18. Numeral 21 designates cylinder units for sliding the slide bases 20 in the just-mentioned manner and they are arranged between the slide bases 20 and the supporting bases 19. A supporting plate 22 is extended from each of the slide bases 20 across the back of the endless chain 4 and the base end of a rotary plate 23 is pivotably attached to each supporting plate 22 by a pin 24. Then, the pair of rotary plates 23 are arranged on the sides of the spindle 1 near thereto. Each of the rotary plates 23 is adapted to make a 90-degree turn about the pin 24 and for this purpose a cylinder unit 25 is connected between each rotary plate 23 and the associated slide base 20. Also, as shown in FIG. 3, a slide support 26 is vertically fitted to the forward end of each rotary plate 23 so as to extend towards the from along the side of the casing 16 and an arm 28 or 29 having a tool gripping claw 27 is slidably mounted on the slide support 26 through slide guides 30. Numeral 31 designates an arm sliding cylinder unit provided between the slide support 26 and the arm 28 or 29.

The tool gripping portion of each of the arms 28 and 29 includes an arcuate fixed support 33 formed with a tool positioning notch 32 at its central portion and the tool gripping claw 27 having its base and pivoted by a pin 34 to the fixed support 33 at around the peripheral end thereof and its central portion connected to a clamp rod 35 by a pin 36 so as to be opened and closed. Then, at the 90°-turned position of each rotary plate 23, the tool gripping portion is opposed perpendicularly to the axis of the spindle 1 or it is brought into a position where it is engaged with the annular groove (not shown) of the tool-fitted holder accomodated in the tool pot 3. Also provided at the base end of the clamp rod 35 is a cam follower 38 adapted to engage with a cam groove 37 formed in the slide support 26 so that during the tool gripping the clamp rod 35 is projected against the spring force of a spring 39 and the tool gripping claw 27 is closed thereby gripping the tool. In other words, the holder fitted with the tool is formed with the annular groove (not shown) so that during the tool gripping the tool gripping claw 27 in the open condition is inserted into the annular groove and it is then closed thus gripping the tool-fitted holder by the fixed support 33 and the tool gripping claw 27.

With the construction described above, the operation of the automatic tool changer according to the invention will now be described.

Where the used tool fitted to the spindle 1 is to be replaced with the tool required for the next operation, the arms 28 and 29 are standing by in the conditions as shown in FIG. 1. In other words, the left arm 28 is placed on a lateral axis 40 of the spindle 1 at a position close and opposite thereto and its tool gripping claw 27 is open. On the other hand, the right arm 29 has its rotary plate 23 turned through 90 degrees about the pin 24 so that the tool required for the next operation and located at the position indexed by the circular movement of the endless chain 4 in the tool magazine 2 is gripped through its holder and it is standing by in this condition. Then, in the illustrated condition, the slide base 20 of the left arm 28 is first moved to the right toward the spindle 1 through the lateral movement cylinder unit 21 so that, when a stage is reached where the fixed support 33 and the tool gripping claw 27 of the arm 28 come near to the annular groove of the tool-fitted holder on the spindle 1, the arm 28 is slightly moved toward the surface side of the paper in the figure by the longitudinal movement cylinder unit 31. As a result, the clamp rod 35 is projected against the spring pressure of the spring 39 due to the engagement between the cam groove 37 and the cam follower 38 and the tool gripping claw 27 is closed thereby gripping the tool-fitted holder on the spindle 1. Then, the lock of the tool-fitted holder is released on the spindle 1 by the engaging and disengaging mechanism which is not shown and the arm 28 is moved further in the direction of the surface of the paper thereby removing the tool-fitted holder from the spindle 1. After the arm 28 gripping the used tool has been returned to the initial position, the right arm 29 which is gripping the tool for the next operation and standing by now removes the tool for the next operation from the tool pot 3 and then its rotary plate 23 is turned through 90 degrees by the turning cylinder unit 25 thereby positioning the arm 29 above the lateral axis 40 of the spindle 1 to oppose it. Then, in the like manner as was the case with the left arm 28, the arm 29 is brought near to the spindle 1 and the tool for the next operation is inserted and fitted to the spindle 1. During the insertion, the tool gripping claw 27 of the arm 29 is opened to release the lock on the holder of the tool and simultaneously the holder fitted with the tool is locked by the engaging and disengaging mechanism of the spindle 1. After the tool for the next operation has been fitted to the spindle 1 in this way, the arm 29 is retreated to a position exactly symmetrical with the illustrated left arm 28 and it stands by for the next tool changing operation. After the completion of the replacement of the used tool with the new tool for the next operation, the desired machining is started by using the new tool and during the machining the left arm 28 is turned by 90 degrees thereby returning the used tool into the given tool pot 3 of the endless chain 4. Then, the left arm 28 again grips the next tool and stands by. The resulting conditions are exactly in an inverse symmetrical relation with the conditions of FIG. 1.

In accordance with the present invention, the above-described embodiment is to be considered as illustrative only and many changes and modifications may be made by those skilled in the art without departing from the scope of the invention. For instance, the slide bases may be of the type which make planary movement in the directions of two axes perpendicular to each other and also the tool gripping portion of each arm may be made of an U-shaped or arcuate resilient member.

What is claimed is:

1. An automatic tool changer for a machine tool, comprising:

a machine tool spindle;

a tool magazine comprising a plurality of tool pots which form receptacles for holders fitted with tools, said tool pots being arranged at pre-determined intervals on an endless chain such that an axis of each said tool pot is parallel to the rotational axis of said spindle;

first and second arms arranged in the vicinity of said machine tool spindle such that said spindle is positioned between said first arms and said second arms;

each of said and first and second arms, respectively, being provided with tool gripping means at the outer end thereof nearest said machine tool spindle so as to be capable of separately performing a tool changing operation;

first and second slide bases arranged, respectively, to be moveable in a direction perpendicular to the rotational axis of said machine tool spindle and alternately of said spindle and perpendicular to the axes of said tool pots, and wherein said first and second slide bases are operably coupled to supporting bases having guide bars;

said slide bases being mechanically coupled to said first and second arms, respectively, as to cause corresponding movement of said arms;

first and second rotary plates, respectively, pivotally mounted with respect to said first and second slide bases and mechanically coupled to said first and second arms, respectively, as to cause pivotal motion of said said first and second arms;

first and second cylinder means, respectively, for actuating said first and second slide bases toward and away from each other along said guide bars; and third and fourth cylinder means, respectively, for actuating said first and second rotary plates.

2. The automatic tool changer defined in claim 1, wherein each said tool gripping means further comprises an arcuate fixed support adapted for engagement with an annular groove formed on each tool fitted holder to be received by the spindle and said tool pots, respectively, and a tool gripping claw adapted for gripping each of said tool fitted holders between it and said fixed support, said gripping claw is pivoted by pins attached to said fixed support in order to be opened and closed.

3. The automatic tool changer defined in claim 2 further comprising:

fifth and sixth cylinder means for actuating, respectively, said claws on said first and second gripping means.

4. The automatic tool changer defined in claim 1, wherein said first and second rotary plates are adapted to rotate through an angle of 90°, respectively, so that said first and second arms can move between said tool pots and said machine tool spindle.

5. The automatic tool changer defined in claim 1, wherein said first and second slide bases are positioned within said endless chain.

* * * * *